(12) United States Patent
Stockton

(10) Patent No.: US 7,640,620 B2
(45) Date of Patent: *Jan. 5, 2010

(54) RETRACTABLE HOSE EXTENSION FOR A VACUUM

(76) Inventor: John H. Stockton, 601 W. Main Ave., Suite 714, Spokane, WA (US) 99201

( * ) Notice: Subject to any disclaimer, the term of this patent is extended or adjusted under 35 U.S.C. 154(b) by 698 days.

This patent is subject to a terminal disclaimer.

(21) Appl. No.: 10/843,496

(22) Filed: May 10, 2004

(65) Prior Publication Data

US 2005/0246854 A1 Nov. 10, 2005

(51) Int. Cl.
*A47L 5/38* (2006.01)
(52) U.S. Cl. .............................. 15/301; 15/314; 15/315; 15/323; 138/118; 138/119
(58) Field of Classification Search .................... 15/301, 15/314, 315, 323; 138/118, 119; *A47L 5/38*
See application file for complete search history.

(56) References Cited

U.S. PATENT DOCUMENTS

| 5,526,842 | A | 6/1996 | Christensen |
| 5,740,581 | A | 4/1998 | Harrelson, II |
| 6,182,327 | B1 | 2/2001 | Gosselin |
| 7,306,012 | B2 * | 12/2007 | Stockton et al. ............. 138/119 |
| 2003/0098084 | A1 | 5/2003 | Ragner |
| 2005/0246855 | A1 | 11/2005 | Stockton et al. |

FOREIGN PATENT DOCUMENTS

| EP | 1 176 352 | 1/2002 |
| WO | WO 01/24677 | 4/2001 |

* cited by examiner

*Primary Examiner*—David A Redding
(74) *Attorney, Agent, or Firm*—Fehr Law Firm; Thompson E. Fehr

(57) ABSTRACT

A retractable hose extension for a vacuum having an expandable hose within a containment structure, a first coupling at the first end of the hose and in the first end of the containment structure for connecting the hose to a vacuum, a valve at the second end of the hose, and either a door or other releasable retention device for the hose. Preferably, the valve is an iris valve. Two fixed embodiment and one portable embodiment exist. The first fixed embodiment is inserted within a wall. The second fixed embodiment is rotatably attached to a tube contained within or running below a ceiling and extending from a vacuum system.

168 Claims, 6 Drawing Sheets

RETRACTABLE HOSE EXTENSION FOR A VACUUM

BACKGROUND OF THE INVENTION

1. Field of the Invention

This invention relates to a hose for a vacuum, especially a retractable hose.

2. Description of the Related Art

A number of patents and published patent applications apply to retractable hoses for vacuum systems.

U.S. Pat. No. 5,740,581 applies to a vacuum hose where a horizontal partition is placed between two wall studs. The upper end of the hose has a handle. Below the handle the hose passes through a drive assembly for pulling the hose below the handle into the space below the partition and then extending the hose when desired.

In the device of U.S. Pat. No. 6,182,327, a handle of a hose is maintained on one side of a conduit through which the remainder of the hose passes into a basket. As the hose drops into the basket, the forces created thereby cause the basket to rotate and coil the hose.

The vacuum hose of U.S. Pat. No. 5,526,842 is retracted onto a spring-loaded reel, which may be located within a wall. A hinged door is urged by a spring toward a closed position. When it is open, the door bears against corrugations of the hose to prevent the hose from being retracted into the wall; it is not used to facilitate the retention of the hose within the wall or other container.

International publication no. WO 01/24677 describes a hose which fits inside and has a head end extending from an open end of a conduit that also has a terminal end. An annular seal is attached to the foot end of the hose to minimize the flow of air past the hose. A cover is "hingedley" attached to the head end of the hose and is, preferably, spring biased to urge the cover closed when a handle is not attached. Then, when a vacuum is applied to the terminal end of the conduit, external air pressure pushes the hose into the conduit. An annular flange acts as a stop against a wall receptacle to preclude the entire hose from being pushed into the conduit. The length of the hose does, however, not vary.

The hose of European patent application no. 1 176 352 has a wall composed of a helical spring covered by two layers of material through which air does not pass. Such layers are bonded to one another around the spring but not in between windings of the spring, thereby creating a continuous helically channel between the windings of the spring. The spring is biased to retract. A pump pushes air into the channel when it is closed in order to extend the hose and withdraws such air to facilitate retraction of the hose.

Appearing most closely related to the present invention, though, is one embodiment of the device described in United States patent application publication no. US 2003/0098084.

The embodiment of interest is a vacuum hose which has a helical spring inside the wall of the hose. Between coils of the spring the wall bows inward. The spring ". . . is biased to expand the hose . . . to its fully extended length. This means that in its compressed position . . . , spring 36b is under compression forces, with force needed to keep it in this retracted state (the force may come from either vacuum pressure and/or support housing). In its relaxed state, the hose . . . can be fully extended and bias spring 36b can still be exerting an extension force on the hose . . . ."

The free end of the hose incorporates a rather complex wand, the complexity of which suggests that a simple valve would be inadequate to retract the hose.

Both a wall-mounted version of the vacuum hose and a portable version are discussed.

The wall-mounted version holds the body of the compressed hose inside a tube with the wand being "snapped (or locked, or clipped, etc.) into place in wand indentation 262" so that the hose can be held in a retracted position without the vacuum operating. And "a door . . . may be place[d] on holding case 260 to provide a clean finish look for the wall in which this hose system is installed. This door can also help hold hose wand 28 in place while not in use."

In the portable version the hose has "a locking end . . . on one end, and hose wand housing . . . on the other." The hose is locked to a vacuum source either with a tube around the hose extending from the wand or a tube inside the hose extending from the wand. The fact that the tube has a locking end at its end which is opposite to the end with the wand, therefore, unfortunately creates a rather lengthy (exceeding the length of the compressed hose) inflexible section of hose that is attached to the wand even when the hose is extended.

Finally, in U.S. Pat. No. 5,114,050 two embodiments of an elevated vacuum hose are shown. In a first embodiment the vacuum hose is held on a reel. In the second embodiment a short flexible hose hangs "in the form of an inverted U" and is retained in an elevated position by a spring so that it can be grasped and pulled to an operating position. The length of the hoses of this patent does not, however, vary, i.e., the length of the hoses cannot be extended or retracted.

BRIEF SUMMARY OF THE INVENTION

Unlike the hoses of U.S. patent application Ser. Nos. 5,740,581; 6,182,327; and 5,526,842 and international publication no. WO 01/24677, the length of the hose in the present Retractable Hose Extension for a Vacuum is, as its name suggests, variable through extension and retraction.

Furthermore, retraction of the hose in the present invention is accomplished merely by closing a valve located at a second end of the hose while a vacuum is being applied to a first end of the hose. And, preferably, this valve is an iris valve so that it remains connected to the second end of the hose throughout operation and storage, in a containment structure, of the hose without impeding the movement of the second end of the hose into the containment structure since an iris valve, contrary to the situation with respect to the complex wand of United States patent application publication no. US 2003/0098084, tends to minimize the need to extend substantially beyond the cross-sectional area of the hose.

The present Retractable Hose Extension for a Vacuum comprises an expandable hose and a containment structure for the hose with a first end of a first coupling in a first end of the containment structure; a second end of the first coupling connected to a first end of the hose; and, as discussed above, a second end of the hose attached to a valve, actually to the first or downstream (relative to the direction of fluid flow when a vacuum is being applied) end of the valve. The second or upstream end of the valve is preferably connected to a first end of a second coupling; the second end of the coupling is preferably constructed to connect to, and be in fluid communication with, traditional vacuum attachments, unlike the apparent situation for the other expandable vacuum hoses discussed above. Clearly, United States patent application publication no. US 2003/0098084 utilizes the complex wand at the free end of the hose. And element number 29 of European patent application no. 1 176 352 would seem to preclude the use of traditional vacuum attachments.

Three embodiments—two fixed and one portable—exist for the Retractable Hose Extension for a Vacuum.

A first fixed embodiment is mounted within in a wall with the first end of the first coupling available for connection to a vacuum system, preferably by being connected to a tube leading to the vacuum of a central vacuum system, although the connection could be to an individual vacuum unit, itself.

In the second fixed embodiment a first end of the containment structure may alternatively be rotatably attached to a tube contained within or running below a ceiling and extending from the vacuum system.

Both fixed embodiments further comprise a retention device in order to retain the hose within the containment structure when no vacuum is being applied to the first end of the hose.

And the portable embodiment, in its most basic form, comprises simply the containment structure with the attached expandable hose and a retention device. Preferably, the portable embodiment further comprises a handle attached to the containment structure. Even more preferably, the containment structure is placed within a carrying case.

In any embodiment, it is preferable that the hose is subject to neither an extending nor a retracting force when the hose is fully extended and the valve is open.

Similarly, for any embodiment, the retention device need simply be any such device that will preclude the hose from leaving the containment structure sufficiently far to depart substantially from the longitudinal axis of the containment structure. Furthermore, such retention device is either (a) attached to a wall from which the hose exits in the case of the first fixed embodiment, to the containment structure near the second end of the containment structure for any embodiment, or within a second end of a carrying case for the portable embodiment or, for any embodiment, (b) a first portion of a retention device is connected to the containment structure near the second end of the containment structure with a mating portion of the retention device attached to the valve (if there is no second coupling) or to the second coupling when one exists.

This causes the retention device to be readily accessible to a user. Thus, unlike the situation with respect to the portable unit of United States patent application publication no. US 2003/0098084, locking does not occur at a distant location from the second end of the hose and therefore require an inflexible section of hose (in publication no. US 2003/0098084 a rigid structure projecting inside or around the extendable hose when locked and proceeding from the end of the extendable hose when unlocked) that is attached to the wand even when the hose is extended.

DETAILED DESCRIPTION OF THE INVENTION

Figure 1:
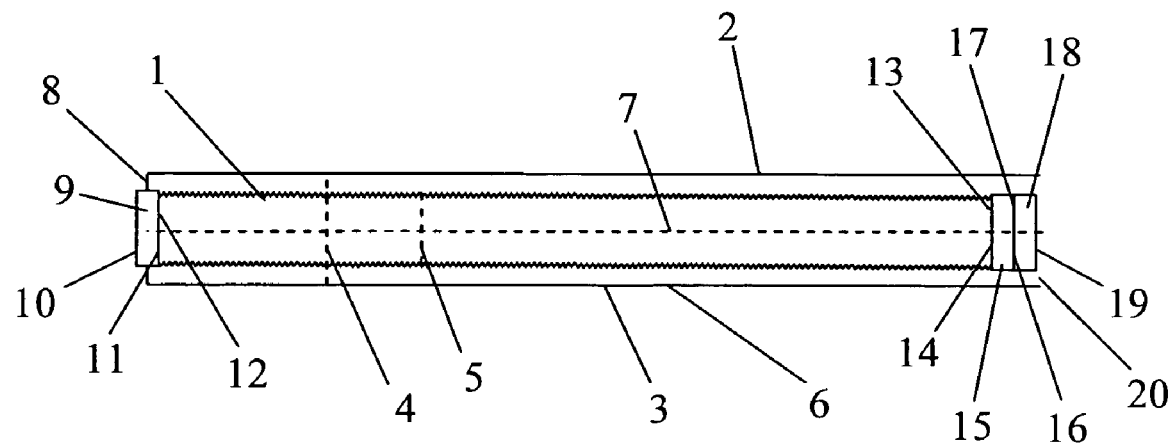
FIG. 1, in a cutaway view, portrays the basic elements of the Retractable Hose Extension for a Vacuum minus a releasable retention device.
Figure 2:
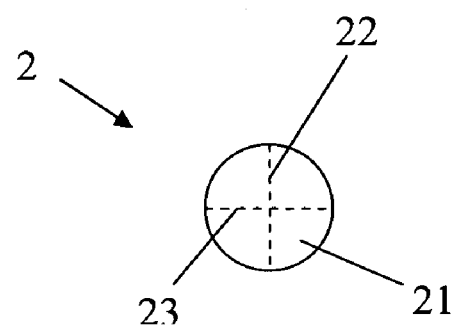
FIG. 2 is a view looking at the second end of embodiment of FIG. 1 with a door attached to the containment structure near the second end of the containment structure.

As indicated above and shown in FIG. 1, the Retractable Hose Extension for a Vacuum comprises an expandable hose 1 and a containment structure 2 for the hose 1.

Preferably, the containment structure 2 is, as illustrated in FIG. 1, a tube 3 having an internal diameter 4 somewhat larger than the outer diameter 5 of the hose 1. The containment structure 2, however, merely needs to be any elongate container 6 (straight or curved) with a cross section of such dimension that the hose 1 substantially follows the longitudinal axis 7 of the container 6 even when no vacuum is being applied to the hose 1.

In a first end 8 the containment structure 2 has a first coupling 9 with a first end 10 available for connection to, and fluid communication with, a vacuum system and with a second end 11 connected to, and in fluid communication with, a first end 12 of the hose 1.

At the second end 13 of the hose 1 is attached a first or downstream end 14 of a valve 15 in fluid communication with the hose 1. Preferably this valve 15 is an iris valve, although it can be any valve which will seal the second end 13 of the hose 1. Non-exclusive examples of such valves are ball valves, butterfly valves, a plate that screws onto a threaded ring attached to the hose, or a spring-loaded cover attached to the hose 1.

Preferably, attached to the end 16 of the valve 15 away from the hose 1, i.e., the second or upstream end 16 of the valve 15, is a first end 17 of a second coupling 18 such that the second coupling 18 is in fluid communication with the valve 15. On its second end 19 the second coupling 18 is preferably constructed to connect to, and be in fluid communication with, traditional vacuum attachments in fluid communication with such second coupling 18.

The hose 1 is contracted, and thereby has its second end 12 drawn into the containment structure 2 through the second end 20 of the containment structure 2 (which second end 20 is sufficiently open that the hose 1, valve 15, and second coupling 18—when such second coupling 18 is utilized—can pass through such second end 20), by application of a vacuum to the first end 12 of the hose 1 when the valve 15 has been closed. After the vacuum has been deactivated, the hose 1 is releasably retained within the containment structure 2 by a releasable retention device 21, which is either a door 21 that cannot be opened with a force that is exerted perpendicular to a plane containing the two longer orthogonal dimensions, i.e., the height 22 and width 23 of the door 21, or other type of releasable retention device 21.

As stated above, in any embodiment, it is preferable that the hose 1 is subject to neither an extending nor a retracting force when the hose 1 is fully extended and the valve 15 is open.

Figure 3:
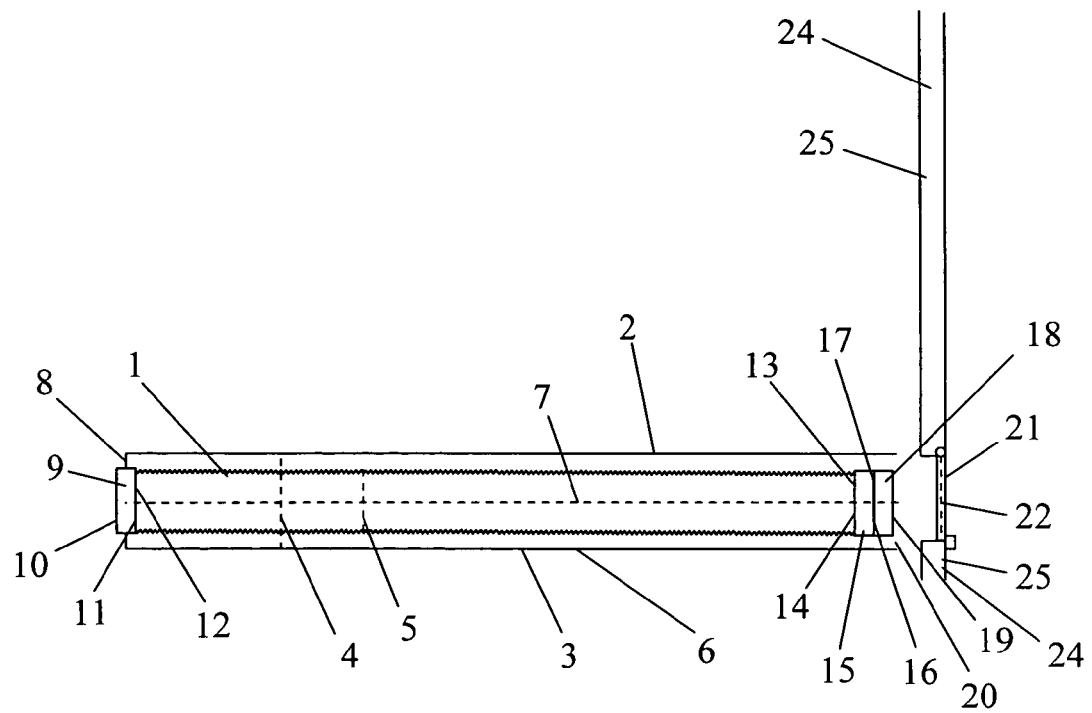
FIG. 3 shows, in a cutaway view, the Retractable Hose Extension for a Vacuum installed within a wall.
Figure 4:
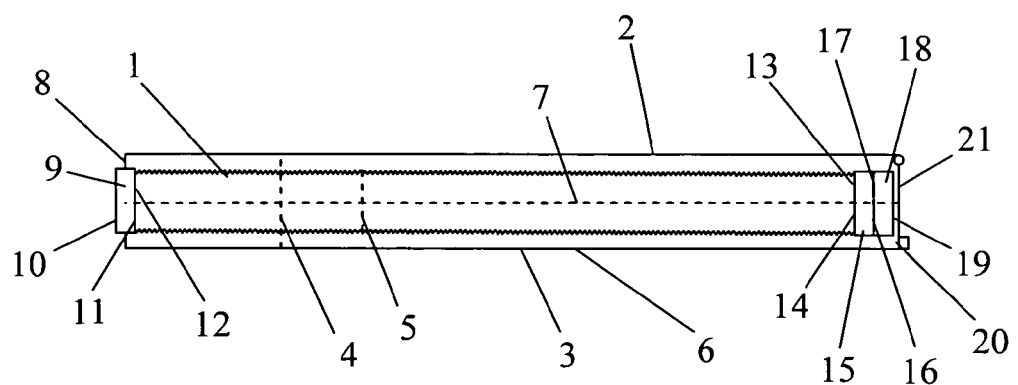
FIG. 4 depicts, in a cutaway view, the embodiment of FIG. 1 with a door attached to the containment structure near the second end of the containment structure.
Figure 5:
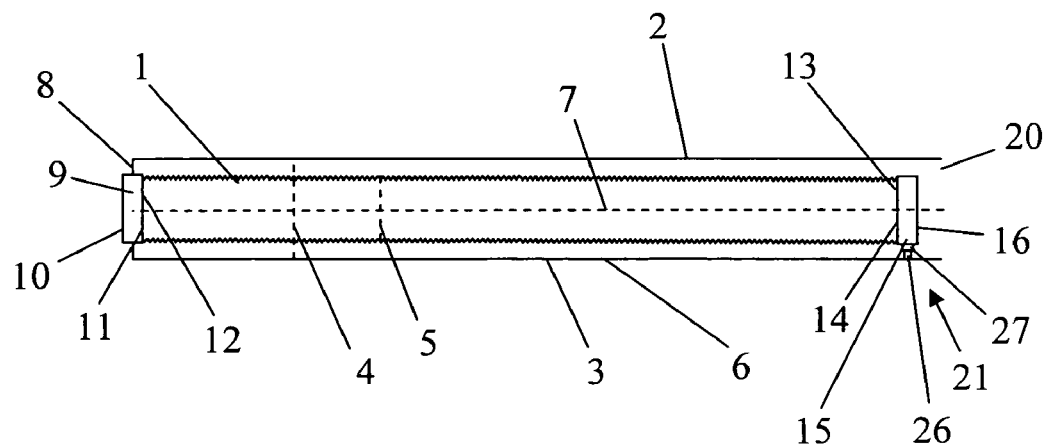
FIG. 5, in a cutaway view, illustrates the embodiment of FIG. 1 with a first portion of a locking device other than a door connected to the second end of the containment structure and a mating portion of the locking device attached to a valve at the second end of the hose.
Figure 6:
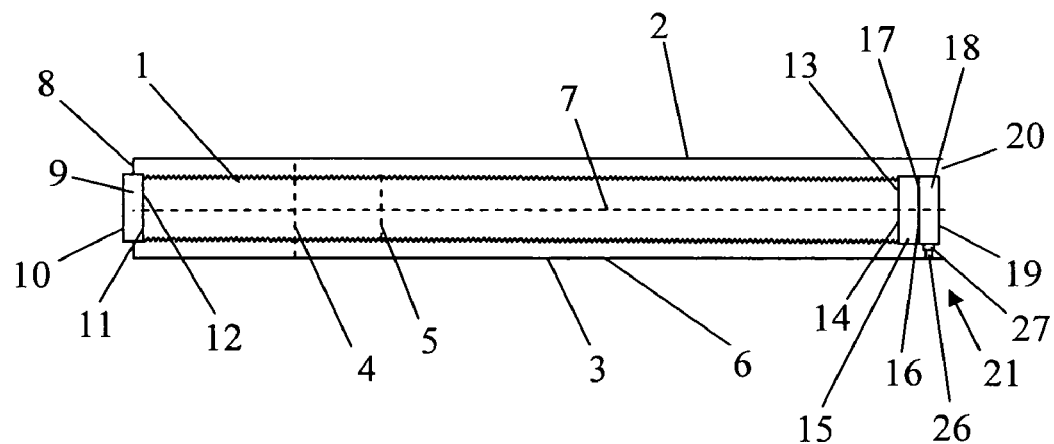
FIG. 6, in a cutaway view, displays the embodiment of FIG. 1 with a first portion of a locking device other than a door connected to the second end of the containment structure and a mating portion of the locking device attached to a second coupling on the second end of the valve.

The containment structure 2 may, in a first fixed embodiment, be installed within a wall 24, as depicted in FIG. 3; if so, the door 21 may be in a side 25 (For the purposes of this patent application, the term "side" of a wall is intended to mean any portion of the wall which has an external surface, such as an end or traditional lateral side.) of the wall 24 with the second end 20 of the containment structure 2 being located so close to such door 21 that, unless the door 21 is opened, the hose 1 cannot leave the containment structure 2 sufficiently far to depart substantially from the longitudinal axis 7 of the containment structure 2. Otherwise (for a containment structure 2 within a wall or elsewhere), either (a) the door 21 is attached to the containment structure 2 near the second end 20 of the containment structure 2, as shown in FIG. 4, which second end 20 is otherwise—as discussed above—sufficiently open that the hose 1, valve 15, and second coupling 18—when such second coupling 18 is utilized—can pass through such second end 20, or (b) a first portion 26 of another type of releasable retention device 21 is connected to the containment structure 2 near the second end 20 of the containment structure 2 with a mating portion 27 of the releasable retention device 21 attached to the valve 15 (if there is no second coupling 18), as illustrated in FIG. 5, or to the second coupling 18 when one exists, as seen in FIG. 6. (Of course, in this latter case there must be some means of accessing the hose 1 through the side 25 of the wall 24 such as a door or an aperture.)

A first end 8 of the containment structure 2 may alternatively be attached, preferably rotatably, to a free end 28 of a tube 29 contained within or running below a ceiling 30 and extending from, as well as being in fluid communication with, a vacuum system, creating a second fixed embodiment. In the rotatable embodiment, the containment structure 2 is moved horizontally with respect to the tube 29.

Figure 7:
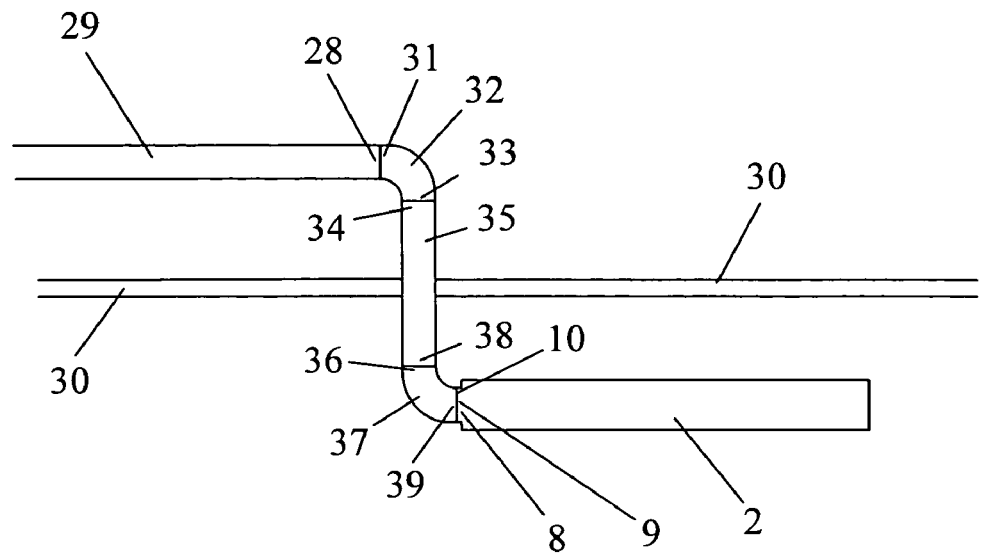
FIG. 7 shows the Retractable Hose Extension for a Vacuum with a first end of the containment structure rotatably attached to a tube within a ceiling where the containment structure is substantially horizontal.
Figure 8:
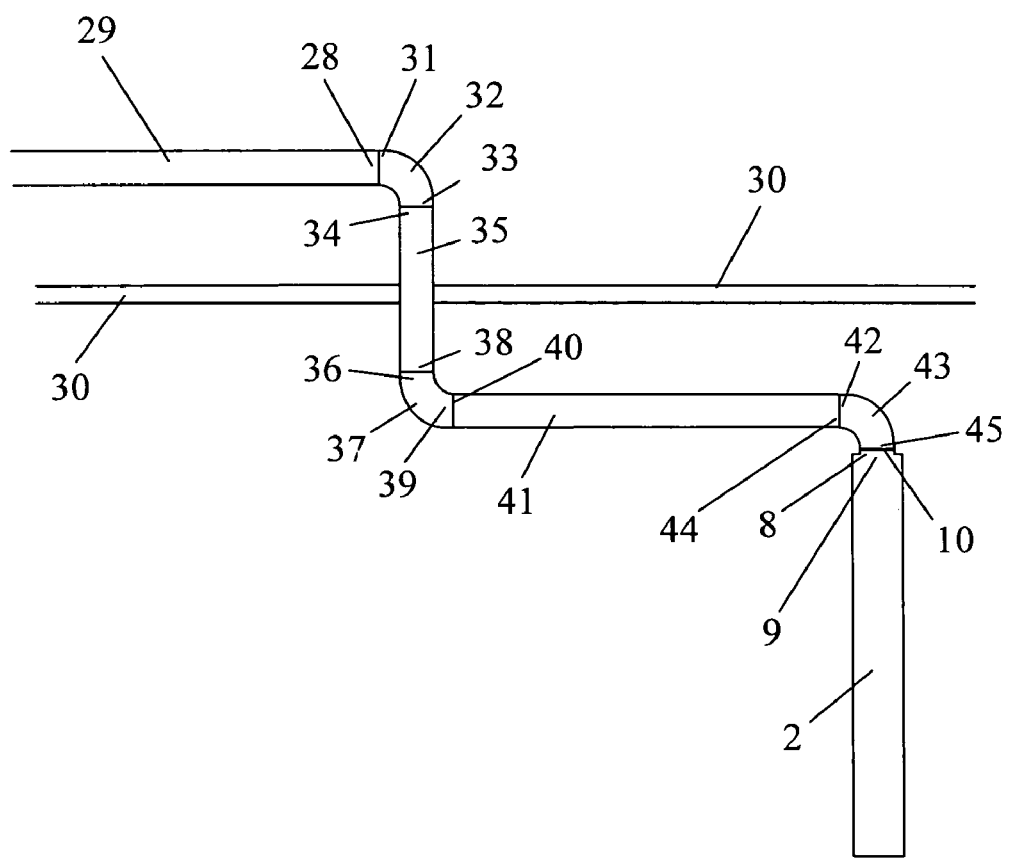
FIG. 8 provides a view of the Retractable Hose Extension for a Vacuum with a first end of the containment structure rotatably attached to a tube within a ceiling where the containment structure is substantially vertical.
Figure 9:
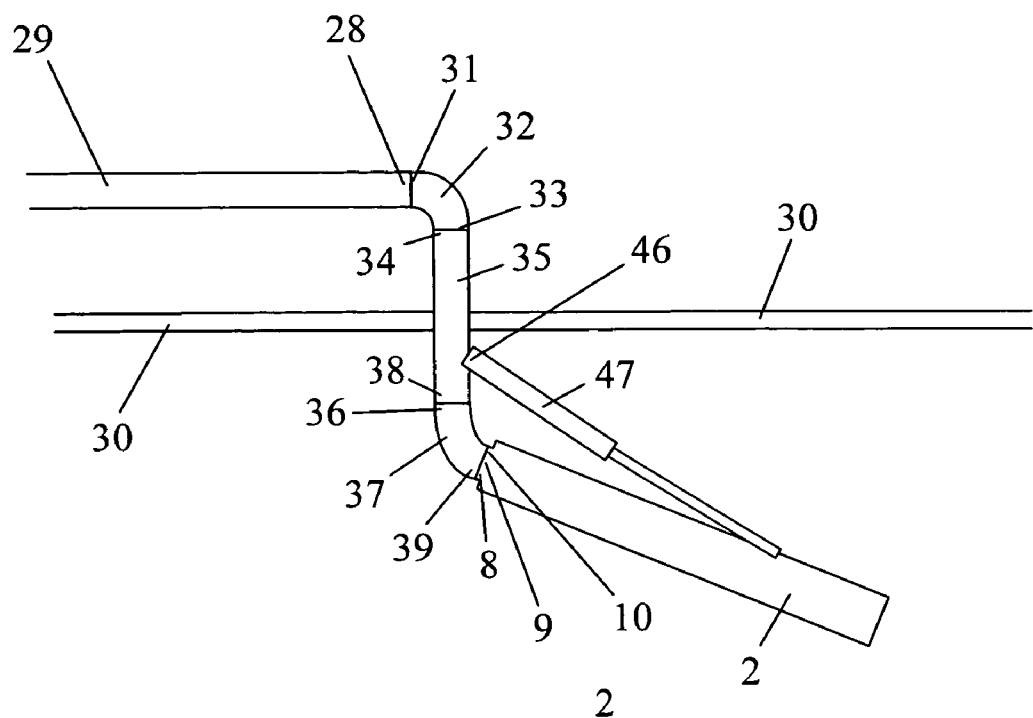
FIG. 9 shows a version of the Retractable Hose Extension for a Vacuum with a first end of the containment structure rotatably attached to a tube within a ceiling where the containment structure is adjustable between a substantially horizontal position and an orientation where its second end is below horizontal alignment with its first end.

At least three options exist for this second fixed embodiment of the Retractable Hose Extension for a Vacuum. The containment structure 2 can be substantially horizontal, as portrayed in FIG. 7; substantially vertical, as illustrated in FIG. 8, or adjustable between a substantially horizontal position and an orientation where its second end 20 is below horizontal alignment with its first end 8, as depicted in FIG. 9.

Any technique that is well known in the art may be utilized to achieve these three configurations. However, the immediately following four paragraphs provide non-exclusive illustrative examples.

In each configuration, a first end 31 of a first elbow 32 is connected to the free end 28 of the tube 29 so that the first elbow is in fluid communication with the tube 29. The second end 33 of the first elbow 32 is attached to a first end 34 of and is in fluid communication with a substantially vertical tube 35. A first end 36 of a second elbow 37 is connected to, and is in fluid communication with, a second end 38 of the substantially vertical tube 35. Either the second end 33 of the first elbow 32 is constructed, using any technique that is well known in the art, to permit the substantially vertical tube 35 to rotate within such second end 33 or the first end 36 of the second elbow 37 is constructed, using any technique that is well known in the art, to rotate about the second end 38 of the substantially vertical tube 35. Therefore, the second end 39 of the second elbow 37 can rotate in a substantially horizontal plane.

For the first configuration, the first end 10 of the first coupling 9, in the first end 8 of the containment structure 2, is simply attached, in fluid communication, to the second end 39 of the second elbow 37. Then the containment structure 2 is substantially horizontal, as illustrated in FIG. 7.

In the second configuration, a first end 40 of a substantially horizontal tube 41 is connected to, and in fluid communication with, the second end 39 of the second elbow 37. A first end 42 of a third elbow 43 is attached to, and in fluid communication with, a second end 44 of the substantially horizontal tube 41. The first end 10 of the first coupling 9, in the first end 8 of the containment structure 2, is attached, in fluid communication, to the second end 45 of the third elbow 43, making the containment structure 2 substantially vertical, as depicted in FIG. 8.

And an exemplary structure for achieving the third configuration is, as shown in FIG. 9, the same as that for the first configuration with the exception that the second elbow 37 is flexible, allowing the containment structure 2 to rotate in a substantially vertical plane. Connected to the substantially vertical tube 35 is a first end 46 of any device 47 which is well known in the art for exerting a force to return the containment structure 2 to a substantially horizontal position after the second end 20 of the containment structure 2 has been pulled below horizontal and which can be locked releasably to retain the second end 20 of the containment structure in a lowered position. Two non-exclusive examples of such a device are (1) a ratchet connected to two substantially rigid arms, one of which is attached to the substantially vertical tube 35 and the other of which is attached to the containment structure 2 with the end of the pawl that does not engage the ratchet connected either to a cord or an electromechanical lever for releasing the pawl from the ratchet and with a spring or gas cylinder connected to both the substantially vertical tube 35 and the containment structure 2 to urge the substantially vertical tube 35 and the containment structure to move angularly toward one another and (2) an electrically motorized screw within a housing where the either the housing or the screw is rotatably connected to the substantially vertical tube 35 and the other is rotatably attached to the containment structure 2.

Of course, in any of the three preceding configurations, an additional tube can be inserted, in fluid communication, between the second end 39 of the second elbow 37 and the first end 10 of the first coupling 9 in order to increase the distance between the substantially vertical tube 35 and the second end 20 of the containment structure 2.

As indicated above, in addition to these two fixed embodiments of the Retractable Hose Extension for a Vacuum, a portable embodiment exists.

Figure 10:
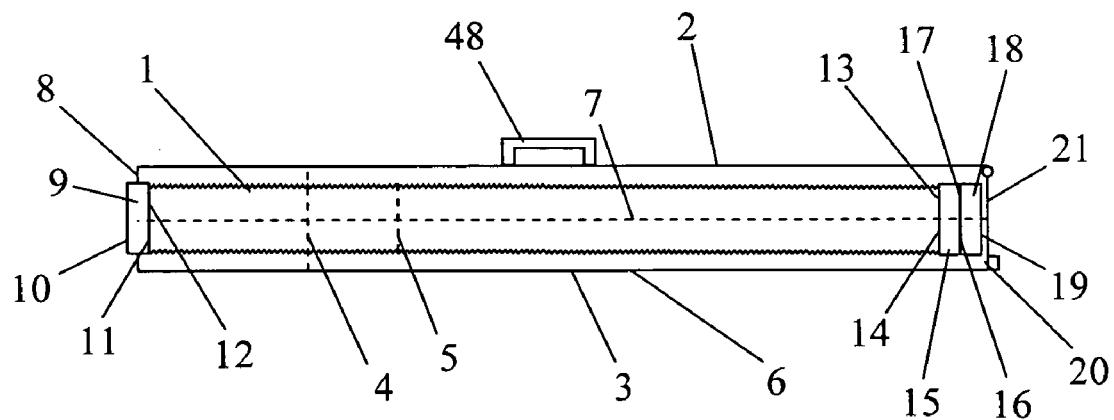
FIG. 10 illustrates, in a cutaway view, a first portable embodiment of the Retractable Hose Extension for a Vacuum.
Figure 11:
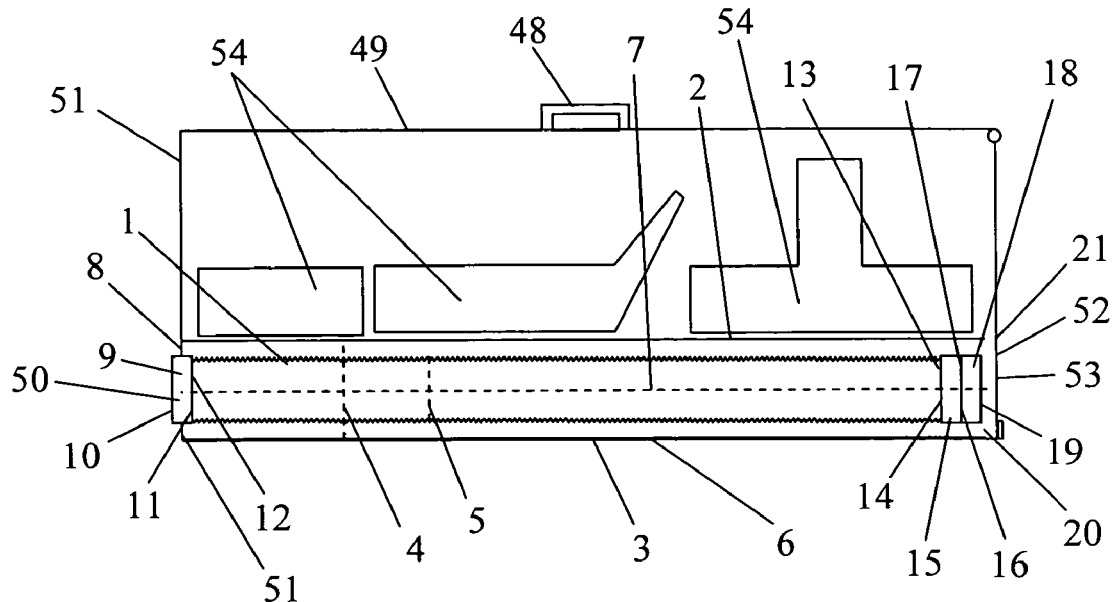
FIG. 11, in a cutaway view, depicts a second portable embodiment of the Retractable Hose Extension for a Vacuum utilizing a carrying case with a door.
Figure 12:
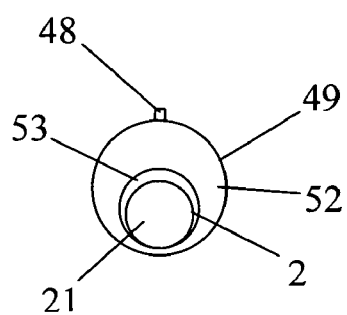
FIG. 12 is an end view of the second portable embodiment of the Retractable Hose Extension for a Vacuum utilizing a carrying case with an aperture without a door, in the second end of the carrying case, and without the optional structure for containing one or more traditional vacuum attachments.

The portable embodiment may, as depicted in FIG. 10, involve simply attaching a handle 48 to the containment structure 2, which contains the hose 1, with the door 21 or one portion of a retention device 21 connected to the containment structure 2 near the second end 20 of the containment structure 2, as described above, or even just having the preceding embodiment without the handle 48. Alternatively, as illustrated in FIG. 11 and FIG. 12, the containment structure 2 and hose 1 are placed within a carrying case 49. The first end 8 of the containment structure 2, to which is attached the first coupling 9, then constitutes a portion 50 of a first end 51 of the carrying case 49; the second end 20 of the containment structure 2 may be attached to the carrying case 49 sufficiently near a second end 52 of the carrying case 49 that the hose 1 cannot leave the containment structure 2 sufficiently far to depart substantially from the longitudinal axis 7 of the containment structure 2. In such a portable embodiment, as illustrated in FIG. 11, a door 21 preferably exists for closing an aperture 53 in the second end 52 of the carrying case 49 through which, when the door 21 has been opened, the hose 1, the valve 15, and the second coupling 18 (when such second coupling 18 is used) can exit the carrying case 49. Otherwise, when a carrying case 49 is utilized, the aperture 53 is, as shown in FIG. 12, present in the second end 52 of the carrying case 49; and either the door 21 is attached to the containment structure 2 near the second end 20 of the containment structure 2, as shown in FIG. 4, or a first portion 26 of another type of retention device 21 is connected to the containment structure 2 near the second end 20 of the containment structure 2 with a mating portion 27 of the retention device 21 attached to the valve 15 (if there is no second coupling 18), as illustrated in FIG. 5, or to the second coupling 18 when one exists, as seen in FIG. 6.

For any embodiment, the door 21—in a wall 24, attached to the second end 20 of the containment structure 2, or within the second end 52 of the carrying case 49—need simply be any type of door 21 that will, when closed, preclude the hose 1 from leaving the containment structure 2 sufficiently far to depart substantially from the longitudinal axis 7 of the containment structure 2; and the unmodified term "door" shall, for the purposes of this patent application, have such meaning. Thus, the door 21 could, for example, be a hinged door 21 with any type of lock that is well known in the art or a door 21 that slides along an external surface of a wall 24, second end 20 of the containment structure 2, or second end 52 of the carrying case 49 and is slid upward from a stop to permit the second end 12 of the hose 1 to leave the containment structure 2. For the carrying case 49 (when the carrying case 49 is constructed of fabric, although it can be constructed of any material known in the art to be suitable), the term "door," for the purposes of this patent application, is intended to include a zipper or other well-know mechanism such as buttons and mating apertures therefor, snaps (also called locking lugs and locking buttons), or hook and loop fasteners marketed under the trademarked name VELCRO that are used to close an aperture 53 in fabric.

Optionally, as illustrated in FIG. 11, the carrying case 49 is constructed, using any structure that is well known in the art, to contain one or more traditional vacuum attachments 54.

The hose 1, in any embodiment, can be any hose 1 that will expand and contract along its length. Most commonly, such hoses 1 have a helically wound wire within the material that forms the wall of the hose. For purposes of the present invention, it is immaterial whether when the hose 1 is fully extended, the helically wound wire exerts a retracting force, no force, or an extending force. It is, however, preferred that there be no force since either a retracting or an extending force would tend to impair the free movement of the hose 1 when it is being employed by a user to vacuum something.

A non-exclusive list of acceptable hoses is taken from the catalog of McMaster-Carr and comprises a SUPERFLEX PVC, wire-reinforced hose (MC part no. 5500k33); a RUBBER TUFF hose (MC part no. 5136K13); a BULK-N-FUME SANTOPRENE hose (MC part no. 53145k61); a BLO-R-VAC, PVC hose (MC part no. 5666K14); and a PVC fiberglass hose (MC part no. 5501k31).

As used herein, the term "substantially" indicates that one skilled in the art would consider the value modified by such terms to be within acceptable limits for the stated value. Also as used herein the term "preferable" or "preferably" means that a specified element or technique is more acceptable than another but not that such specified element or technique is a necessity.

I claim:

1. A retractable hose extension for a vacuum, which comprises:
    an expandable hose having a first end and a second end;
    a containment structure having a first end, a second end which is sufficiently open that said hose can pass through it, and a longitudinal axis;
    a first coupling located in the first end of said containment structure, said first coupling having a first end available for connection to, and fluid communication with, a vacuum system and also having a second end that is connected to and in fluid communication with a first end of said hose;
    a valve of such dimensions that said valve can pass through the second end of said containment structure, said valve having a first end attached to, and in fluid communication with, said hose and said valve also having a second end; and
    a means for releasably retaining said hose within said containment structure.

2. The retractable hose extension for a vacuum as recited in claim 1, wherein:
    said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

3. The retractable hose extension for a vacuum as recited in claim 1, wherein:
    said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

4. The retractable hose extension for a vacuum as recited in claim 1, wherein:
    said containment structure is installed within a wall having a means for allowing access to said hose and further comprising:
        a first portion of a releasable retention device connected to said containment structure near the second end of said containment structure; and
        a mating portion of said releasable retention device attached to said valve.

5. The retractable hose extension for a vacuum as recited in claim 1, further comprising:
    a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

6. The retractable hose extension for a vacuum as recited in claim 5, wherein:
    said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

7. The retractable hose extension for a vacuum as recited in claim 5, wherein:
said means for releasably retaining said hose within said containment structure comprises:
a first portion of a releasable retention device connected to said containment structure near the second end of said containment structure; and
a mating portion of said releasable retention device attached to said valve.

8. The retractable hose extension for a vacuum as recited in claim 1, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

9. The retractable hose extension for a vacuum as recited in claim 8, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

10. The retractable hose extension for a vacuum as recited in claim 8, wherein:
said means for releasably retaining said hose within said containment structure comprises:
a first portion of a releasable retention device connected to said containment structure near the second end of said containment structure; and
a mating portion of said releasable retention device attached to said valve.

11. The retractable hose extension for a vacuum as recited in claim 1, further comprising:
a handle attached to said containment structure.

12. The retractable hose extension for a vacuum as recited in claim 11, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

13. The retractable hose extension for a vacuum as recited in claim 11, wherein:
said means for releasably retaining said hose within said containment structure comprises:
a first portion of a releasable retention device connected to said containment structure near the second end of said containment structure; and
a mating portion of said releasable retention device attached to said valve.

14. The retractable hose extension for a vacuum as recited in claim 1, further comprising:
a carrying case having a first end and a second end with said containment structure placed in said carrying case, with the first end of said containment structure constituting a portion of the first end of said carrying case, with the second end of said carrying case containing a door in an aperture, with such aperture being of such dimensions that said hose and said valve can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

15. The retractable hose extension for a vacuum as recited in claim 14, wherein:
said carrying case is constructed to contain one or more traditional vacuum attachments.

16. The retractable hose extension for a vacuum as recited in claim 14, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

17. The retractable hose extension for a vacuum as recited in claim 16, wherein:
said carrying case is constructed to contain one or more traditional vacuum attachments.

18. The retractable hose extension for a vacuum as recited in claim 1, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment stucture—a door that when closed, precludes said hose from leaving said containment structure sufficiently far to depart substantially from the longitudinal axis of said containment structure.

19. The retractable hose extension for a vacuum as recited in claim 18, wherein:
said carrying case is constructed to contain one or more traditional vacuum attachments.

20. The retractable hose extension for a vacuum as recited in claim 1, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device connected to said containment structure near the second end of said containment structure; and
a mating portion of said releasable retention device attached to said valve.

21. The retractable hose extension for a vacuum as recited in claim 20, wherein:
said carrying case is constructed to contain one or more traditional vacuum attachments.

22. The retractable hose extension for a vacuum as recited in claim 1, wherein:
said expandable hose is so constructed that, when fully extended, said expandable hose exerts neither a retracting nor and extending force.

23. The retractable hose extension for a vacuum as recited in claim 22, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

24. The retractable hose extension for a vacuum as recited in claim 22, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

25. The retractable hose extension for a vacuum as recited in claim 22, wherein:
said containment structure is installed within a wall having a means for allowing access to said hose and further comprising:
a first portion of a releasable retention device connected to said containment structure near the second end of said containment structure; and
a mating portion of said releasable retention device attached to said valve.

26. The retractable hose extension for a vacuum as recited in claim 22, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

27. The retractable hose extension for a vacuum as recited in claim 26, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

28. The retractable hose extension for a vacuum as recited in claim 26, wherein:
said means for releasably retaining said hose within said containment structure comprises:
a first portion of a releasable retention device connected to said containment structure near the second end of said containment structure; and
a mating portion of said releasable retention device attached to said valve.

29. The retractable hose extension for a vacuum as recited in claim 22, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

30. The retractable hose extension for a vacuum as recited in claim 29, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

31. The retractable hose extension for a vacuum as recited in claim 29, wherein:
said means for releasably retaining said hose within said containment structure comprises:
a first portion of a releasable retention device connected to said containment structure near the second end of said containment structure; and
a mating portion of said releasable retention device attached to said valve.

32. The retractable hose extension for a vacuum as recited in claim 22, further comprising:
a handle attached to said containment structure.

33. The retractable hose extension for a vacuum as recited in claim 32, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

34. The retractable hose extension for a vacuum as recited in claim 32, wherein:
said means for releasably retaining said hose within said containment structure comprises:
a first portion of a releasable retention device connected to said containment structure near the second end of said containment structure; and
a mating portion of said releasable retention device attached to said valve.

35. The retractable hose extension for a vacuum as recited in claim 22, further comprising:
a carrying case having a first end and a second end with said containment structure placed in said carrying case, with the first end of said containment structure constituting a portion of the first end of said carrying case, with the second end of said carrying case containing a door in an aperture, with such aperture being of such dimensions that said hose and said valve can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

36. The retractable hose extension for a vacuum as recited in claim 35, wherein:
said carrying case is constructed to contain one or more traditional vacuum attachments.

37. The retractable hose extension for a vacuum as recited in claim 35, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

38. The retractable hose extension for a vacuum as recited in claim 37, wherein:
said carrying case is constructed to contain one or more traditional vacuum attachments.

39. The retractable hose extension for a vacuum as recited in claim 22, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment structure—a door that when closed, precludes said hose from leaving said containment structure sufficiently far to depart substantially from the longitudinal axis of said containment structure.

40. The retractable hose extension for a vacuum as recited in claim 39, wherein:
said carrying case is constructed to contain one or more traditional vacuum attachments.

41. The retractable hose extension for a vacuum as recited in claim 22, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device, connected to said containment structure near the second end of said containment structure; and
a mating portion of said releasable retention device attached to said valve.

42. The retractable hose extension for a vacuum as recited in claim 41, wherein:
said carrying case is constructed to contain one or more traditional vacuum attachments.

43. The retractable hose extension for a vacuum as recited in claim 22, wherein:
said valve is an iris valve.

44. The retractable hose extension for a vacuum as recited in claim 43, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

45. The retractable hose extension for a vacuum as recited in claim 43, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

46. The retractable hose extension for a vacuum as recited in claim 43, wherein:
said containment structure is installed within a wall having a means for allowing access to said hose and further comprising:
a first portion of a releasable retention device connected to said containment structure near the second end of said containment structure; and
a mating portion of said releasable retention device attached to said valve.

47. The retractable hose extension for a vacuum as recited in claim 43, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

48. The retractable hose extension for a vacuum as recited in claim 47, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

49. The retractable hose extension for a vacuum as recited in claim 47, wherein:
said means for releasably retaining said hose within said containment structure comprises:
a first portion of a releasable retention device connected to said containment structure near the second end of said containment structure; and
a mating portion of said releasable retention device attached to said valve.

50. The retractable hose extension for a vacuum as recited in claim 43, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

51. The retractable hose extension for a vacuum as recited in claim 50, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

52. The retractable hose extension for a vacuum as recited in claim 50, wherein:
said means for releasably retaining said hose within said containment structure comprises:
a first portion of a releasable retention device connected to said containment structure near the second end of said containment structure; and
a mating portion of said releasable retention device attached to said valve.

53. The retractable hose extension for a vacuum as recited in claim 43, further comprising:
a handle attached to said containment structure.

54. The retractable hose extension for a vacuum as recited in claim 53, wherein:

said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

55. The retractable hose extension for a vacuum as recited in claim 53, wherein:

said means for releasably retaining said hose within said containment structure comprises:

a first portion of a releasable retention device connected to said containment structure near the second end of said containment structure; and a mating portion of said releasable retention device attached to said valve.

56. The retractable hose extension for a vacuum as recited in claim 43, further comprising:

a carrying case having a first end and a second end with said containment structure placed in said carrying case, with the first end of said containment structure constituting a portion of the first end of said carrying case, with the second end of said carrying case containing a door in an aperture, such aperture being of such dimensions that said hose and said valve can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

57. The retractable hose extension for a vacuum as recited in claim 56, wherein:

said carrying case is constructed to contain one or more traditional vacuum attachments.

58. The retractable hose extension for a vacuum as recited in claim 56, wherein:

said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

59. The retractable hose extension for a vacuum as recited in claim 58, wherein:

said carrying case is constructed to contain one or more traditional vacuum attachments.

60. The retractable hose extension for a vacuum as recited in claim 43, further comprising:

a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment stucture—a door that when closed, precludes said hose from leaving said containment structure sufficiently far to depart substantially from the longitudinal axis of said containment structure.

61. The retractable hose extension for a vacuum as recited in claim 60, wherein:

said carrying case is constructed to contain one or more traditional vacuum attachments.

62. The retractable hose extension for a vacuum as recited in claim 43, further comprising:

a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:

a first portion of a releasable retention device connected to said containment structure near the second end of said containment structure; and a mating portion of said releasable retention device attached to said valve.

63. The retractable hose extension for a vacuum as recited in claim 62, wherein:

said carrying case is constructed to contain one or more traditional vacuum attachments.

64. The retractable hose extension for a vacuum as recited in claim 43, further comprising:

a second coupling of such dimensions that said second coupling can pass through the second end of said containment structure, said second coupling having a first end and a second end with the first end of said second coupling attached to the second end of said valve so that said second coupling is in fluid communication with said valve, the second end of said second coupling being constructed to connect to, and be in fluid communication with, traditional vacuum attachments.

65. The retractable hose extension for a vacuum as recited in claim 64, wherein:

said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

66. The retractable hose extension for a vacuum as recited in claim 64, wherein:

said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

67. The retractable hose extension for a vacuum as recited in claim 64, wherein:

said containment structure is installed within a wall having a means for allowing access to said hose and further comprising:

a first portion of a releasable retention device connected to said containment structure near the second end of said containment structure; and a mating portion of said releasable retention device attached to said second coupling.

68. The retractable hose extension for a vacuum as recited in claim 64, further comprising:

a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

69. The retractable hose extension for a vacuum as recited in claim 68, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

70. The retractable hose extension for a vacuum as recited in claim 68, wherein:
said means for releasably retaining said hose within said containment structure comprises:
a first portion of a releasable retention device connected to said containment structure near the second end of said containment structure; and
a mating portion of said releasable retention device attached to said second coupling.

71. The retractable hose extension for a vacuum as recited in claim 64, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

72. The retractable hose extension for a vacuum as recited in claim 71, wherein:
said means for releasably retaining said hose within said containment structure comprises, attached to said containment structure near the Second end of said containment structure, a door that when closed, precludes said hose from leaving said containment structure sufficiently far to depart substantially from the longitudinal axis of said containment structure.

73. The retractable hose extension for a vacuum as recited in claim 71, wherein:
said means for releasably retaining said hose within said containment structure comprises:
a first portion of a releasable retention device connected to said containment structure near the second end of said containment structure; and
a mating portion of said releasable retention device attached to said second coupling.

74. The retractable hose extension for a vacuum as recited in claim 64, further comprising:
a handle attached to said containment structure.

75. The retractable hose extension for a vacuum as recited in claim 74, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

76. The retractable hose extension for a vacuum as recited in claim 74, wherein:
said means for releasably retaining said hose within said containment structure comprises:
a first portion of a releasable retention device connected to said containment structure near the second end of said containment structure; and
a mating portion of said releasable retention device attached to said second coupling.

77. The retractable hose extension for a vacuum as recited in claim 64, further comprising:
a carrying case having a first end and a second end with said containment structure placed in said carrying case, with the first end of said containment structure constituting a portion of the first end of said carrying case, with the second end of said carrying case containing a door in an aperture, such aperture being of such dimensions that said hose and said valve and said second coupling can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

78. The retractable hose extension for a vacuum as recited in claim 77, wherein:
said carrying case is constructed to contain one or more traditional vacuum attachments.

79. The retractable hose extension for a vacuum as recited in claim 77, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

80. The retractable hose extension for a vacuum as recited in claim 79, wherein:
said carrying case is constructed to contain one or more traditional vacuum attachments.

81. The retractable hose extension for a vacuum as recited in claim 64, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment stucture—a door that when closed, precludes said hose from leaving said containment structure sufficiently far to depart substantially from the longitudinal axis of said containment structure.

82. The retractable hose extension for a vacuum as recited in claim 81, wherein:
said carrying case is constructed to contain one or more traditional vacuum attachments.

83. The retractable hose extension for a vacuum as recited in claim 64, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device connected to said containment structure near the second end of said containment structure; and a mating portion of said releasable retention device attached to said second coupling.

84. The retractable hose extension for a vacuum as recited in claim 83, wherein:
said carrying case is constructed to contain one or more traditional vacuum attachments.

85. The retractable hose extension for a vacuum as recited in claim 22, further comprising:
a second coupling of such dimensions that said second coupling can pass through the second end of said containment structure, said second coupling having a first end and a second end with the first end of said second coupling attached to the second end of said valve so that said second coupling is in fluid communication with said valve, the second end of said second coupling being constructed to connect to, and be in fluid communication with, traditional vacuum attachments.

86. The retractable hose extension for a vacuum as recited in claim 85, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

87. The retractable hose extension for a vacuum as recited in claim 85, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

88. The retractable hose extension for a vacuum as recited in claim 85, wherein:
said containment structure is installed within a wall having a means for allowing access to said hose and further comprising:
a first portion of a releasable retention device connected to said containment structure near the second end of said containment structure; and
a mating portion of said releasable retention device attached to said second coupling.

89. The retractable hose extension for a vacuum as recited in claim 85, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

90. The retractable hose extension for a vacuum as recited in claim 89, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

91. The retractable hose extension for a vacuum as recited in claim 89, wherein:
said means for releasably retaining said hose within said containment structure comprises:

a first portion of a releasable retention device connected to said containment structure near the second end of said containment structure; and
a mating portion of said releasable retention device attached to said second coupling.

92. The retractable hose extension for a vacuum as recited in claim 85, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

93. The retractable hose extension for a vacuum as recited in claim 92, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

94. The retractable hose extension for a vacuum as recited in claim 92, wherein:
said means for releasably retaining said hose within said containment structure comprises:
a first portion of a releasable retention device connected to said containment structure near the second end of said containment structure; and
a mating portion of said releasable retention device attached to said second coupling.

95. The retractable hose extension for a vacuum as recited in claim 85, further comprising:
a handle attached to said containment structure.

96. The retractable hose extension for a vacuum as recited in claim 95, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

97. The retractable hose extension for a vacuum as recited in claim 95, wherein:
said means for releasably retaining said hose within said containment structure comprises:
a first portion of a releasable retention device connected to said containment structure near the second end of said containment structure; and
a mating portion of said releasable retention device attached to said second coupling.

98. The retractable hose extension for a vacuum as recited in claim 85, further comprising:
a carrying case having a first end and a second end with said containment structure placed in said carrying case, with the first end of said containment structure constituting a portion of the first end of said carrying case, with the second end of said carrying case containing a door in an aperture, carrying case, with the second end of said carrying case containing a door in an aperture, such aperture being of such dimensions that said hose and said valve and said second coupling can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

99. The retractable hose extension for a vacuum as recited in claim 98, wherein:
said carrying case is constructed to contain one or more traditional vacuum attachments.

100. The retractable hose extension for a vacuum as recited in claim 98, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

101. The retractable hose extension for a vacuum as recited in claim 100, wherein:
said carrying case is constructed to contain one or more traditional vacuum attachments.

102. The retractable hose extension for a vacuum as recited in claim 85, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment stucture—a door that when closed, precludes said hose from leaving said containment structure sufficiently far to depart substantially from the longitudinal axis of said containment structure.

103. The retractable hose extension for a vacuum as recited in claim 102, wherein:
said carrying case is constructed to contain one or more traditional vacuum attachments.

104. The retractable hose extension for a vacuum as recited in claim 85, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device connected to said containment structure near the second end of said containment structure; and
a mating portion of said releasable retention device attached to said second coupling.

105. The retractable hose extension for a vacuum as recited in claim 104, wherein:
said carrying case is constructed to contain one or more traditional vacuum attachments.

106. The retractable hose extension for a vacuum as recited in claim 1, wherein:
said valve is an iris valve.

107. The retractable hose extension for a vacuum as recited in claim 106, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

108. The retractable hose extension for a vacuum as recited in claim 106, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

109. The retractable hose extension for a vacuum as recited in claim 106, wherein:
said containment structure is installed within a wall having a means for allowing access to said hose and further comprising:
a first portion of a releasable retention device connected to said containment structure near the second end of said containment structure; and
a mating portion of said releasable retention device attached to said valve.

110. The retractable hose extension for a vacuum as recited in claim 106, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

111. The retractable hose extension for a vacuum as recited in claim 110, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

112. The retractable hose extension for a vacuum as recited in claim 110, wherein:
said means for releasably retaining said hose within said containment structure comprises:
a first portion of a releasable retention device connected to said containment structure near the second end of said containment structure; and
a mating portion of said releasable retention device attached to said valve.

113. The retractable hose extension for a vacuum as recited in claim 106, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

114. The retractable hose extension for a vacuum as recited in claim 113, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

115. The retractable hose extension for a vacuum as recited in claim 113, wherein:
said means for releasably retaining said hose within said containment structure comprises:
a first portion of a releasable retention device connected to said containment structure near the second end of said containment structure; and
a mating portion of said releasable retention device attached to said valve.

116. The retractable hose extension for a vacuum as recited in claim 106, further comprising:
a handle attached to said containment structure.

117. The retractable hose extension for a vacuum as recited in claim 116, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

118. The retractable hose extension for a vacuum as recited in claim 116, wherein:
said means for releasably retaining said hose within said containment structure comprises:
a first portion of a releasable retention device connected to said containment structure near the second end of said containment structure; and
a mating portion of said releasable retention device attached to said valve.

119. The retractable hose extension for a vacuum as recited in claim 106, further comprising:
a carrying case having a first end and a second end with said containment structure placed in said carrying case, with the first end of said containment structure constituting a portion of the first end of said carrying case, with the second end of said carrying case containing a door in an aperture, with such aperture being of such dimensions that said hose and said valve can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

120. The retractable hose extension for a vacuum as recited in claim 119, wherein:
said carrying case is constructed to contain one or more traditional vacuum attachments.

121. The retractable hose extension for a vacuum as recited in claim 119, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

122. The retractable hose extension for a vacuum as recited in claim 121, wherein:
said carrying case is constructed to contain one or more traditional vacuum attachments.

123. The retractable hose extension for a vacuum as recited in claim 106, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment stucture—a door that when closed, precludes said hose from leaving said containment structure sufficiently far to depart substantially from the longitudinal axis of said containment structure.

124. The retractable hose extension for a vacuum as recited in claim 123, wherein:
said carrying case is constructed to contain one or more traditional vacuum attachments.

125. The retractable hose extension for a vacuum as recited in claim 106, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device connected to said containment structure near the second end of said containment structure; and
a mating portion of said releasable retention device attached to said valve.

126. The retractable hose extension for a vacuum as recited in claim 125, wherein:
said carrying case is constructed to contain one or more traditional vacuum attachments.

127. The retractable hose extension for a vacuum as recited in claim 106, further comprising:
a second coupling of such dimensions that said second coupling can pass through the second end of said containment structure, said second coupling having a first end and a second end with the first end of said second coupling attached to the second end of said valve so that said second coupling is in fluid communication with said valve, the second end of said second coupling being constructed to connect to, and be in fluid communication with, traditional vacuum attachments.

128. The retractable hose extension for a vacuum as recited in claim 127, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

129. The retractable hose extension for a vacuum as recited in claim 127, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

130. The retractable hose extension for a vacuum as recited in claim 127, wherein:
said containment structure is installed within a wall having a means for allowing access to said hose and further comprising:
a first portion of a releasable retention device connected to said containment structure near the second end of said containment structure; and
a mating portion of said releasable retention device attached to said second coupling.

131. The retractable hose extension for a vacuum as recited in claim 127, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

132. The retractable hose extension for a vacuum as recited in claim 131, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

133. The retractable hose extension for a vacuum as recited in claim 131, wherein:
said means for releasably retaining said hose within said containment structure comprises:
a first portion of a releasable retention device connected to said containment structure near the second end of said containment structure; and
a mating portion of said releasable retention device attached to said second coupling.

134. The retractable hose extension for a vacuum as recited in claim 127, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

135. The retractable hose extension for a vacuum as recited in claim 134, wherein:
said means for releasably retaining said hose within said containment structure comprises, attached said containment structure near to the second end of said containment structure, a door that when closed, precludes said hose from leaving said containment structure sufficiently far to depart substantially from the longitudinal axis of said containment structure.

136. The retractable hose extension for a vacuum as recited in claim 134, wherein:
said means for releasably retaining said hose within said containment structure comprises:
a first portion of a releasable retention device connected to said containment structure near the second end of said containment structure; and
a mating portion of said releasable retention device attached to said second coupling.

137. The retractable hose extension for a vacuum as recited in claim 127, further comprising:
a handle attached to said containment structure.

138. The retractable hose extension for a vacuum as recited in claim 137, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

139. The retractable hose extension for a vacuum as recited in claim 137, wherein:
said means for releasably retaining said hose within said containment structure comprises:
a first portion of a releasable retention device connected to said containment structure near the second end of said containment structure; and
a mating portion of said releasable retention device attached to said second coupling.

140. The retractable hose extension for a vacuum as recited in claim 127, further comprising:
a carrying case having a first end and a second end with said containment structure placed in said carrying case, with the first end of said containment structure constituting a portion of the first end of said carrying case, with the second end of said carrying case containing a door in an aperture, such aperture being of such dimensions that said hose and said valve and said second coupling can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

141. The retractable hose extension for a vacuum as recited in claim 140, wherein:
said carrying case is constructed to contain one or more traditional vacuum attachments.

142. The retractable hose extension for a vacuum as recited in claim 140, wherein:
said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

143. The retractable hose extension for a vacuum as recited in claim 142, wherein:
said carrying case is constructed to contain one or more traditional vacuum attachments.

144. The retractable hose extension for a vacuum as recited in claim 127, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment structure—a door that when closed, precludes said hose from leaving said containment structure sufficiently far to depart substantially from the longitudinal axis of said containment structure.

145. The retractable hose extension for a vacuum as recited in claim 144, wherein:
said carrying case is constructed to contain one or more traditional vacuum attachments.

146. The retractable hose extension for a vacuum as recited in claim 127, further comprising:
a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:
a first portion of a releasable retention device connected to said containment structure near the second end of said containment structure; and
a mating portion of said releasable retention device attached to said second coupling.

147. The retractable hose extension for a vacuum as recited in claim 146, wherein:
said carrying case is constructed to contain one or more traditional vacuum attachments.

148. The retractable hose extension for a vacuum as recited in claim 1, further comprising:
a second coupling of such dimensions that said second coupling can pass through the second end of said containment structure, said second coupling having a first end and a second end with the first end of said second coupling attached to the second end of said valve so that said second coupling is in fluid communication with said valve, the second end of said second coupling being constructed to connect to, and be in fluid communication with, traditional vacuum attachments.

149. The retractable hose extension for a vacuum as recited in claim 148, wherein:
said containment structure is installed within a wall having a side with a door in the side of the wall and with said containment structure being located so close to said door that, unless said door is opened, said hose cannot leave said containment structure sufficiently far to depart substantially from the longitudinal axis of said containment structure.

150. The retractable hose extension for a vacuum as recited in claim 148, wherein:
said containment structure is installed within a wall having a means for allowing access to said hose and further comprising, attached to said containment structure near the second end of said containment structure, a door that when closed, precludes said hose from leaving said containment structure sufficiently far to depart substantially from the longitudinal axis of said containment structure.

151. The retractable hose extension for a vacuum as recited in claim 148, wherein:
said containment structure is installed within a wall having a means for allowing access to said hose and further comprising:
a first portion of a releasable retention device connected to said containment structure near the second end of said containment structure; and
a mating portion of said releasable retention device attached to said second coupling.

152. The retractable hose extension for a vacuum as recited in claim 148, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially horizontal.

153. The retractable hose extension for a vacuum as recited in claim 152, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

154. The retractable hose extension for a vacuum as recited in claim 152, wherein:
said means for releasably retaining said hose within said containment structure comprises:
a first portion of a releasable retention device connected to said containment structure near the second end of said containment structure; and
a mating portion of said releasable retention device attached to said second coupling.

155. The retractable hose extension for a vacuum as recited in claim 148, further comprising:
a means for rotatably attaching the first end of said containment structure to a free end of a tube contained within or running below a ceiling and extending from, as well as being in fluid communication with, a vacuum system so that said containment structure can be moved horizontally with respect to the tube while having said containment structure remain substantially vertical.

156. The retractable hose extension for a vacuum as recited in claim 155, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

157. The retractable hose extension for a vacuum as recited in claim 155, wherein:
said means for releasably retaining said hose within said containment structure comprises:
a first portion of a releasable retention device connected to said containment structure near the second end of said containment structure; and
a mating portion of said releasable retention device attached to said second coupling.

158. The retractable hose extension for a vacuum as recited in claim 148, further comprising:
a handle attached to said containment structure.

159. The retractable hose extension for a vacuum as recited in claim 158, wherein:
said means for releasably retaining said hose within said containment structure comprises, attached to said containment structure near the second end of said containment structure, a door that when closed, precludes said hose from leaving said containment structure sufficiently far to depart substantially from the longitudinal axis of said containment structure.

160. The retractable hose extension for a vacuum as recited in claim 158, wherein:
said means for releasably retaining said hose within said containment structure comprises:
a first portion of a releasable retention device connected to said containment structure near the second end of said containment structure; and a mating portion of said releasable retention device attached to said second coupling.

161. The retractable hose extension for a vacuum as recited in claim 148, further comprising:

a carrying case having a first end and a second end with said containment structure placed in said carrying case, with the first end of said containment structure constituting a portion of the first end of said carrying case, with the second end of said carrying case containing a door in an aperture, such aperture being of such dimensions that said hose and said valve and said second coupling can pass through such aperture when the door has been opened, and with the second end of said containment structure being attached to said carrying case sufficiently near said door that, unless said door is opened, said hose cannot leave said containment structure sufficiently far to depart substantially from the longitudinal axis of said containment structure.

162. The retractable hose extension for a vacuum as recited in claim 161, wherein:

said carrying case is constructed to contain one or more traditional vacuum attachments.

163. The retractable hose extension for a vacuum as recited in claim 161, wherein:

said door is selected from the group consisting of a hinged door attached to the second end of said carrying case and having a lock, a sliding door that slides along an external surface of the second end of said carrying case and is slid upward from a stop to permit the second end of said hose to leave said containment structure, a zipper, buttons and mating apertures therefor, snaps, and hook and loop fasteners.

164. The retractable hose extension for a vacuum as recited in claim 163, wherein:

said carrying case is constructed to contain one or more traditional vacuum attachments.

165. The retractable hose extension for a vacuum as recited in claim 148, further comprising:

a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises—attached to said containment structure near the second end of said containment structure—a door that when closed, precludes said hose from leaving said containment structure sufficiently far to depart substantially from the longitudinal axis of said containment structure.

166. The retractable hose extension for a vacuum as recited in claim 165, wherein:

said carrying case is constructed to contain one or more traditional vacuum attachments.

167. The retractable hose extension for a vacuum as recited in claim 148, further comprising:

a carrying case having a first end and a second end with said containment structure placed in said carrying case, with the first end of said containment structure constituting a portion of the first end of said carrying case, with the second end of said carrying case containing an aperture, and wherein said means for releasably retaining said hose within said containment structure comprises:

a first portion of a releasable retention device connected to said containment structure near the second end of said containment structure; and a mating portion of said releasable retention device attached to said second coupling.

168. The retractable hose extension for a vacuum as recited in claim 167, wherein:

said carrying case is constructed to contain one or more traditional vacuum attachments.

* * * * *